(12) United States Patent
Wen et al.

(10) Patent No.: US 10,338,720 B2
(45) Date of Patent: Jul. 2, 2019

(54) PRESSURE DETECTION STRUCTURE AND TOUCH DEVICE

(71) Applicant: Shenzhen Goodix Technology Co., Ltd., Shenzhen (CN)

(72) Inventors: Dafei Wen, Shenzhen (CN); Wu Liu, Shenzhen (CN); Rui Ran, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 36 days.

(21) Appl. No.: 15/614,521

(22) Filed: Jun. 5, 2017

(65) Prior Publication Data
US 2017/0269758 A1 Sep. 21, 2017

Related U.S. Application Data

(63) Continuation of application No. PCT/CN2016/090619, filed on Jul. 20, 2016.

(30) Foreign Application Priority Data

Dec. 31, 2015 (CN) .......................... 2015 1 1028722

(51) Int. Cl.
*G06F 3/041* (2006.01)
*G01L 1/00* (2006.01)
(Continued)

(52) U.S. Cl.
CPC ............ *G06F 3/0414* (2013.01); *G01L 1/146* (2013.01); *G01L 1/205* (2013.01); *G06F 1/1643* (2013.01);
(Continued)

(58) Field of Classification Search
CPC .......... G06F 3/041; G06F 3/045; G06F 3/033; G06F 3/048; G01R 27/26; G06K 11/06;
(Continued)

(56) References Cited

U.S. PATENT DOCUMENTS 9,501,195 B1 * 11/2016 Kim .................... G02F 1/13338
2010/0052700 A1 * 3/2010 Yano ....................... G06F 3/044
324/658

(Continued)

FOREIGN PATENT DOCUMENTS

CN 101978342 A 2/2011
CN 102053751 A 5/2011
(Continued)

*Primary Examiner* — Pegeman Karimi

(57) ABSTRACT

A pressure detection structure and a touch device are disclosed. The structure is mounted on a middle frame of the touch device and includes a cover, a display device and a pressure sensor. The display device is arranged below the cover, and includes a display module. The pressure sensor is arranged in the display device; any electrically conductive member in the display device or the middle frame which is electrically conductive is used as a reference electrode; and a variable gap is present between the pressure sensor and the reference electrode, and the pressure sensor outputs a pressure signal according to variation of capacitance between a sensing electrode thereof and the reference electrode. According to the present application, pressure detection may be carried out accurately, and thus reliability of products is enhanced.

7 Claims, 11 Drawing Sheets

(51) Int. Cl.
*G01L 1/20* (2006.01)
*G01L 1/14* (2006.01)
*G06F 1/16* (2006.01)
*G06F 3/044* (2006.01)

(52) U.S. Cl.
CPC .... *G06F 3/044* (2013.01); *G06F 2203/04107* (2013.01)

(58) Field of Classification Search
CPC . G06K 9/00; G08C 21/00; G09G 5/08; G09G 5/00; G09G 5/10; G09G 5/02; G01L 1/00
See application file for complete search history.

(56) References Cited

U.S. PATENT DOCUMENTS

| | | | |
|---|---|---|---|
| 2010/0220071 A1* | 9/2010 | Nishihara | G06F 3/0416 345/173 |
| 2010/0253645 A1 | 10/2010 | Bolender | |
| 2011/0090175 A1* | 4/2011 | Mamba | G06F 3/0412 345/174 |
| 2013/0234734 A1 | 9/2013 | Iida et al. | |
| 2015/0153951 A1 | 6/2015 | Kim et al. | |
| 2015/0363023 A1 | 12/2015 | Kawaguchi et al. | |
| 2017/0003778 A1* | 1/2017 | Shepelev | G06F 3/0414 |
| 2017/0160854 A1* | 6/2017 | Huang | G06F 3/0414 |

FOREIGN PATENT DOCUMENTS

| | | |
|---|---|---|
| CN | 103593100 A | 2/2014 |
| CN | 104951124 A | 9/2015 |
| CN | 105068695 A | 11/2015 |
| CN | 204759381 U | 11/2015 |
| CN | 105138183 A | 12/2015 |
| CN | 205302238 U | 6/2016 |
| CN | 205302239 U | 6/2016 |
| CN | 205384588 U | 7/2016 |
| JP | 2009169523 A | 7/2009 |
| JP | 2011086191 A | 4/2011 |
| JP | 2015005231 A | 1/2015 |
| KR | 100480162 B1 | 4/2005 |
| KR | 20150096104 A | 8/2015 |
| WO | 2015/165562 A1 | 11/2015 |

* cited by examiner

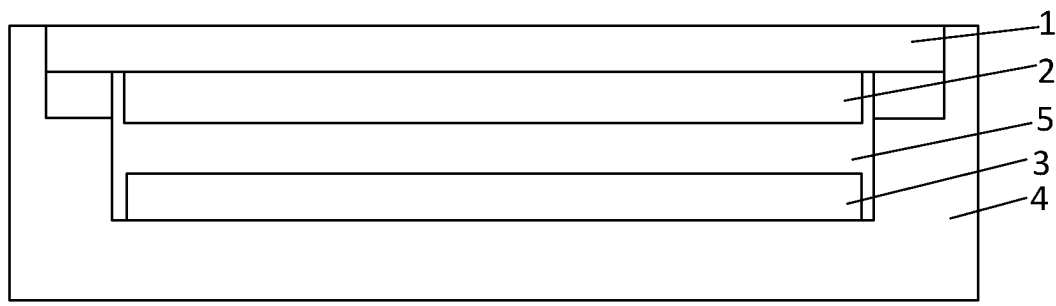
FIG. 1.1
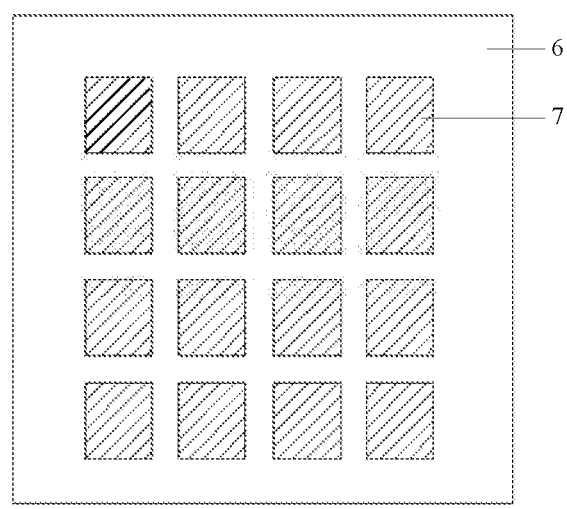
FIG. 1.2
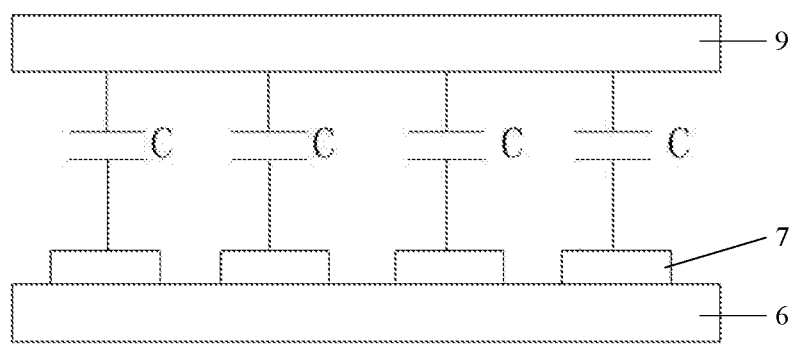
FIG. 1.3

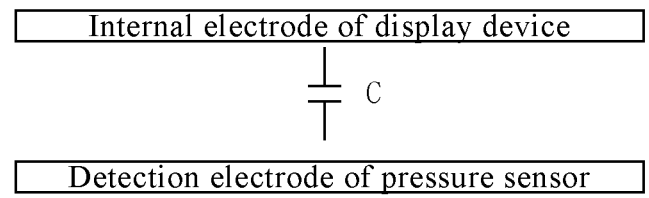
FIG. 1.4
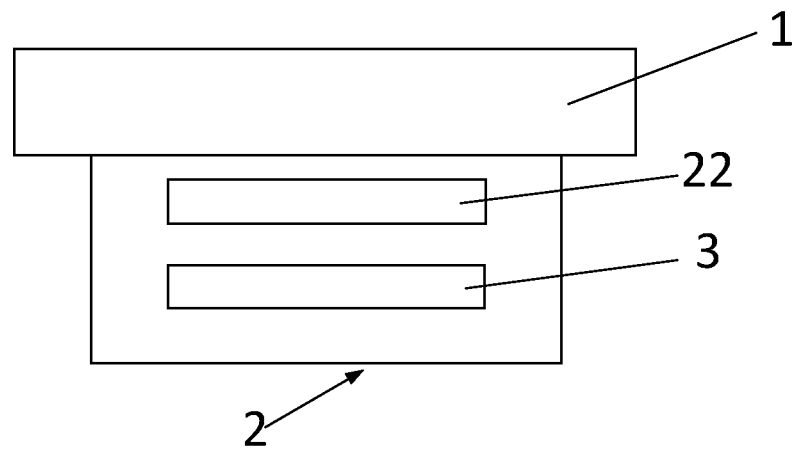
FIG. 2.1
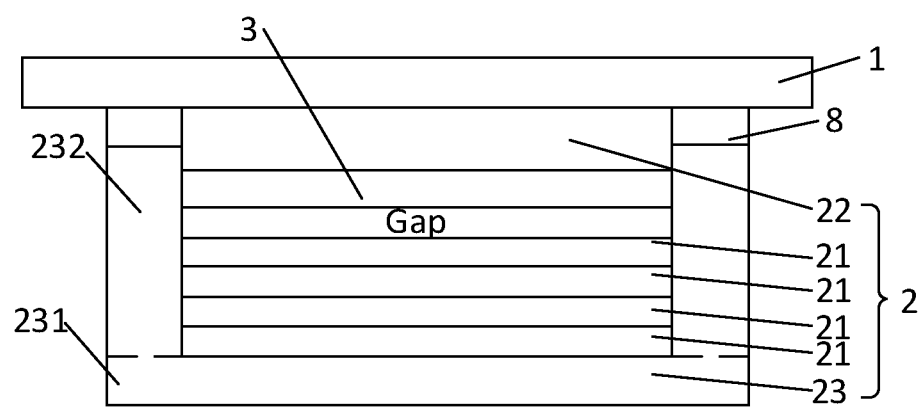
FIG. 2.2

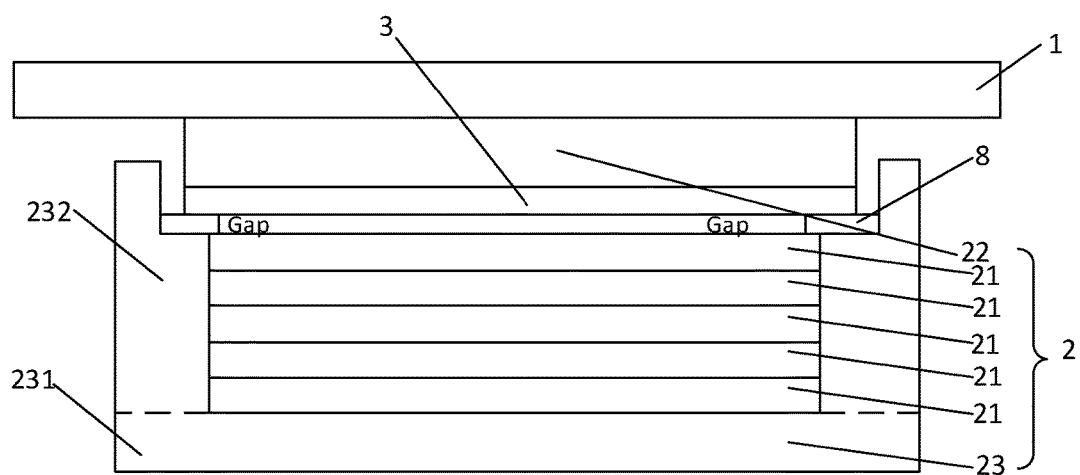
FIG. 2.3
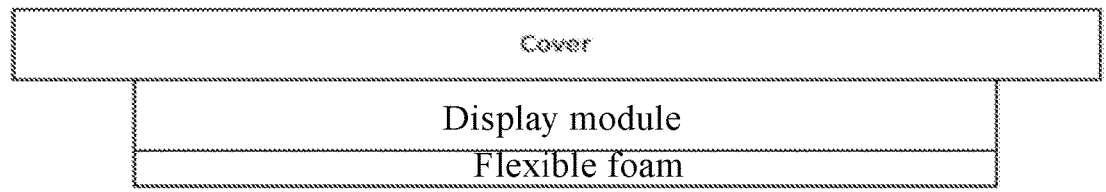
FIG. 2.4

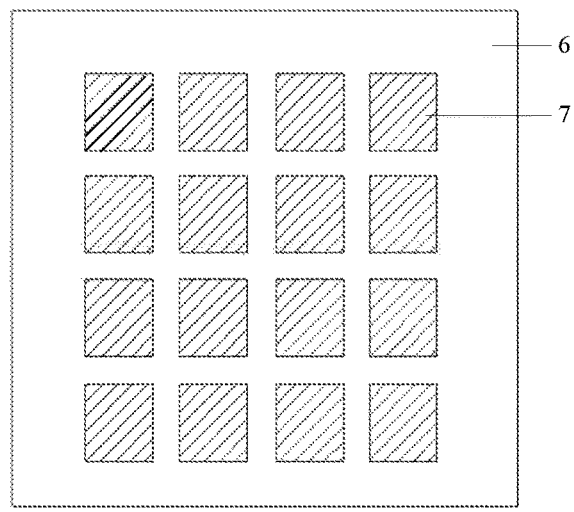
FIG. 3.1
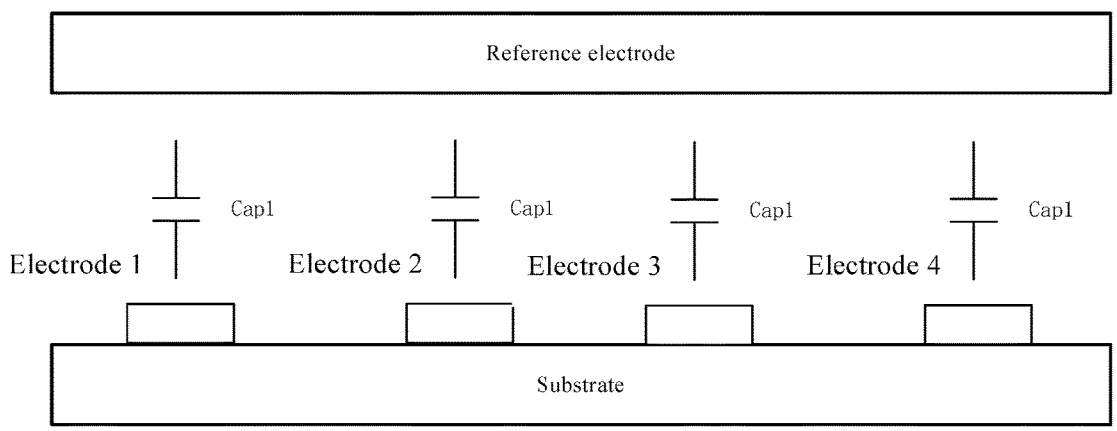
FIG. 3.2
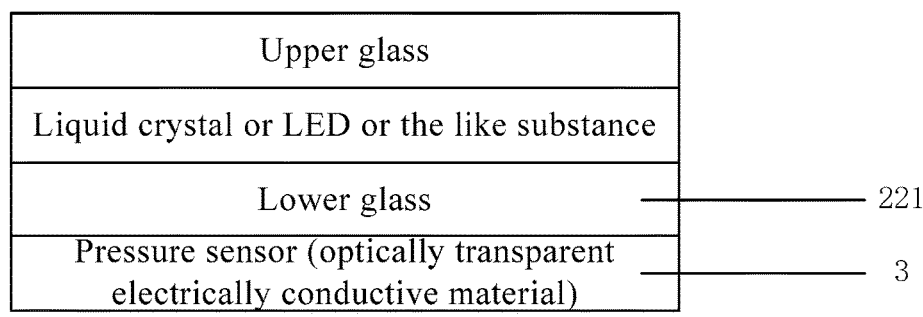
FIG. 3.3

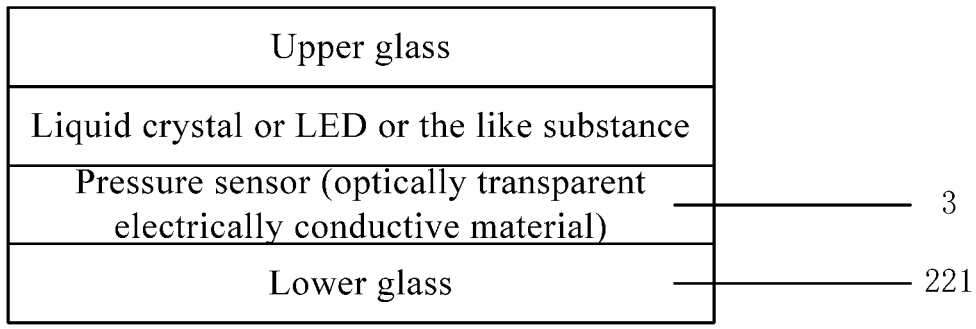
FIG. 3.4
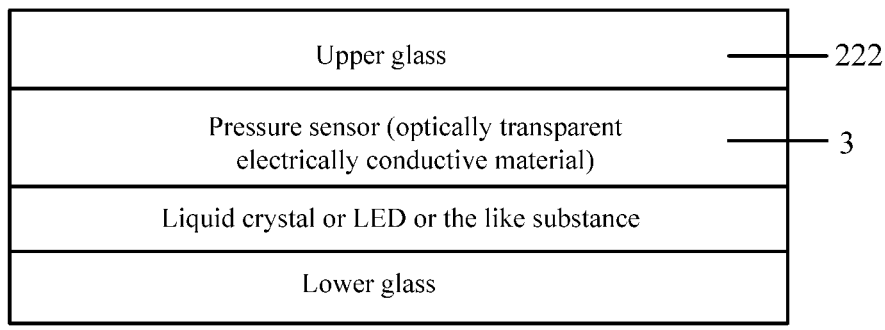
FIG. 3.5
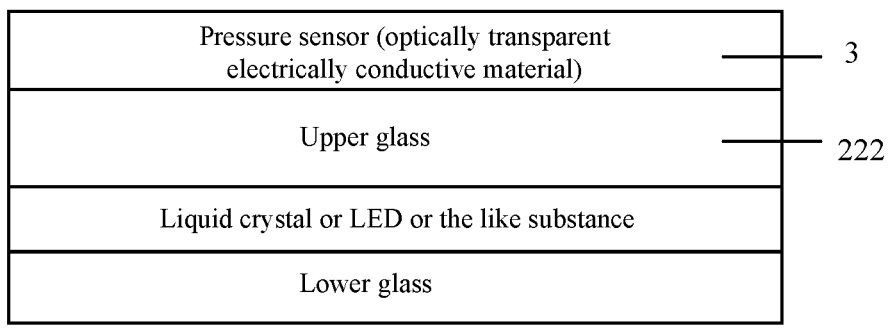
FIG. 3.6

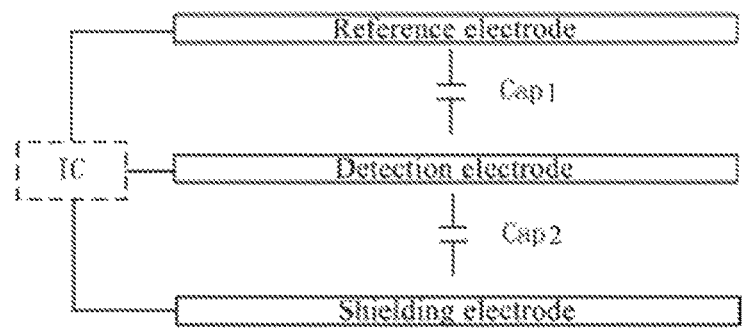
FIG. 7
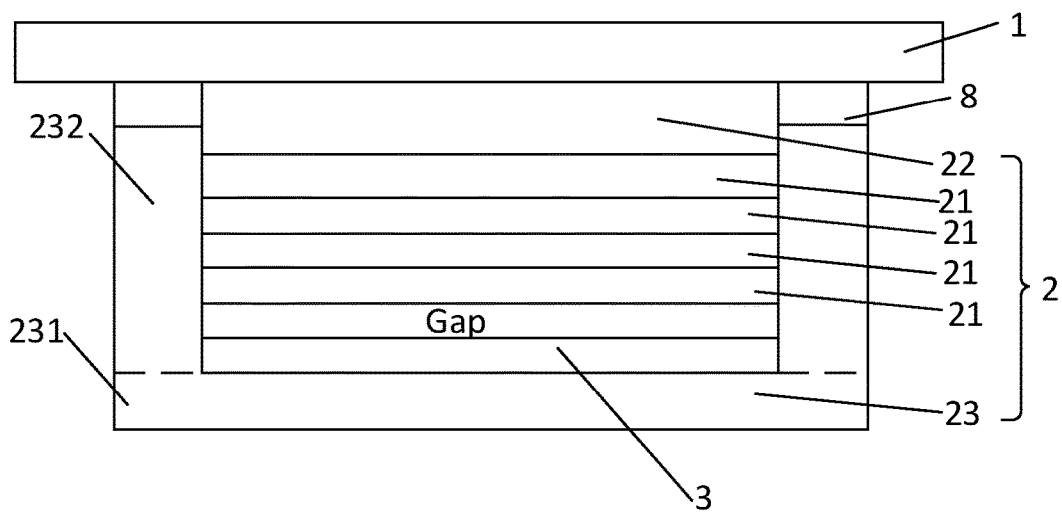
FIG. 8.1
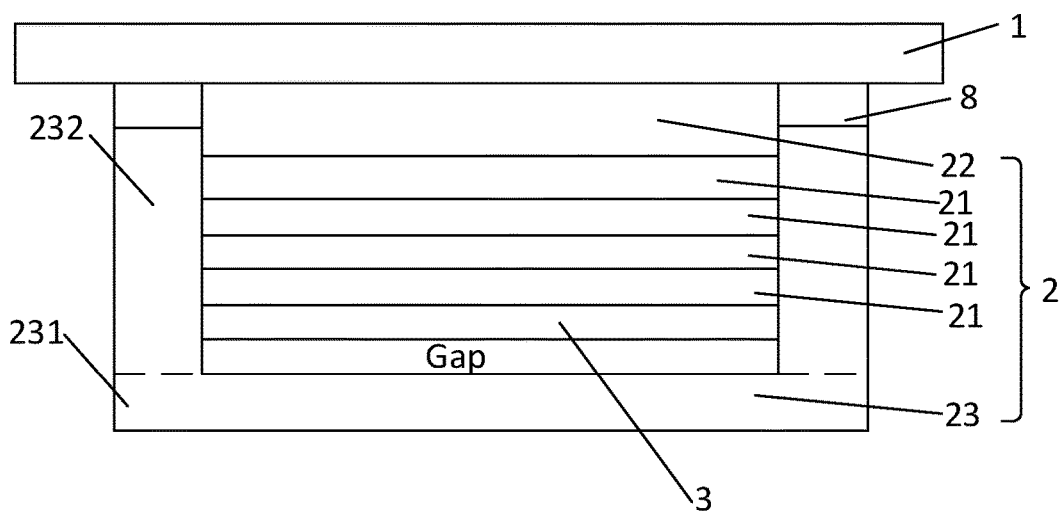
FIG. 8.2

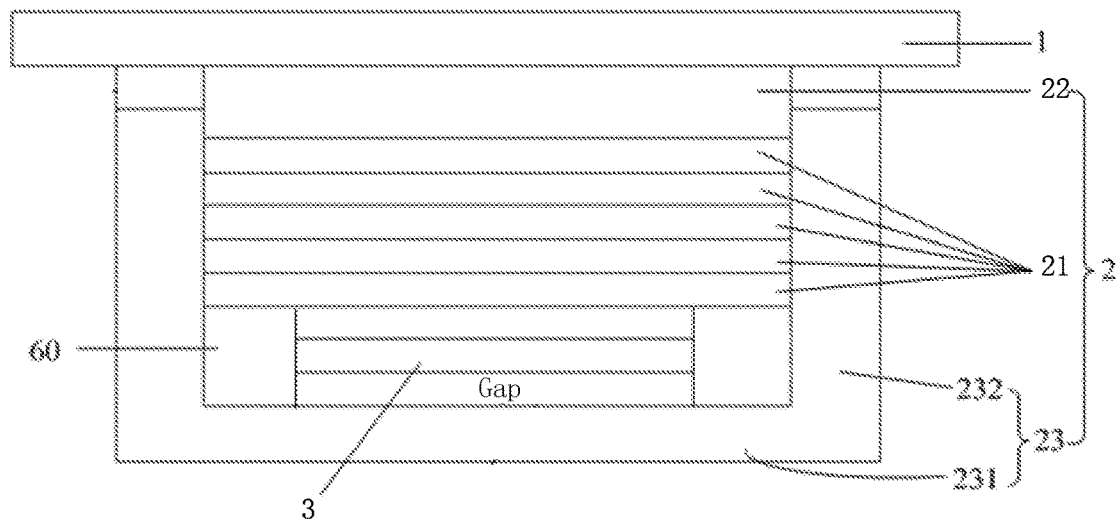
FIG. 9.1
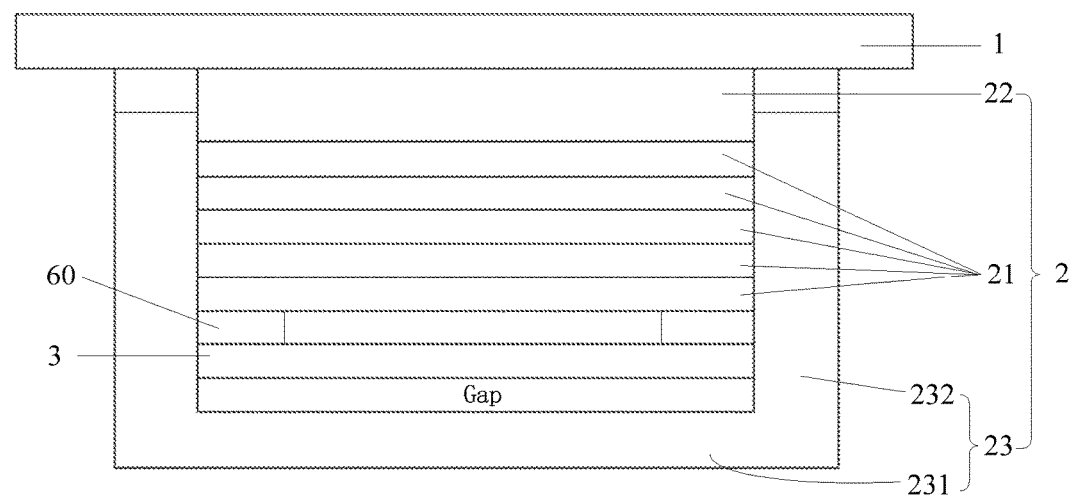
FIG. 9.2

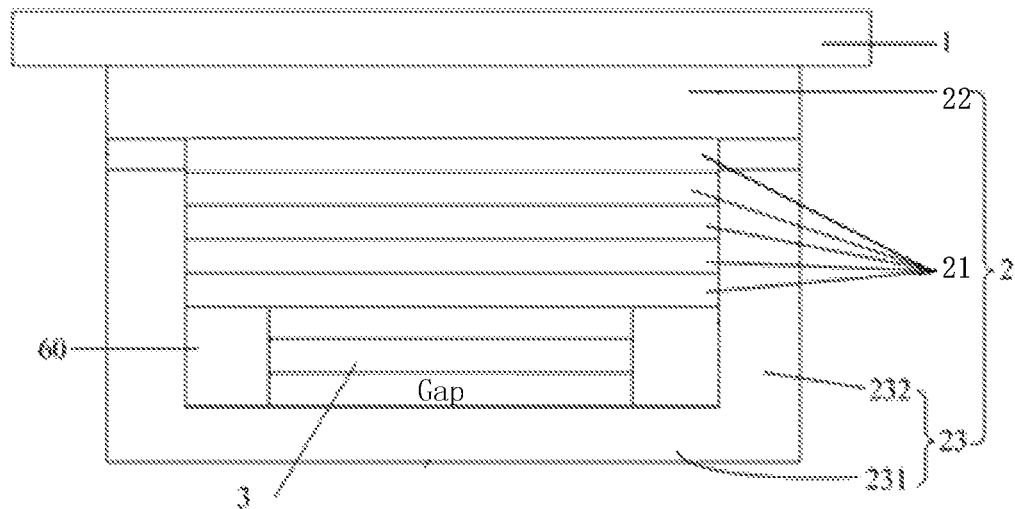
FIG. 10.1
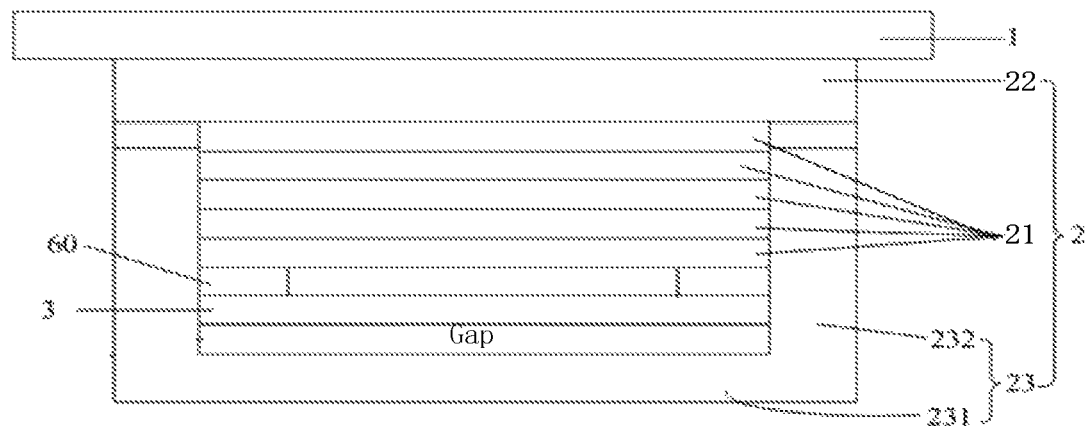
FIG. 10.2

PRESSURE DETECTION STRUCTURE AND TOUCH DEVICE

CROSS-REFERENCE TO RELATED APPLICATIONS

The present application is a continuation of international application No. PCT/CN2016/090619, filed on Jul. 20, 2016, which claims priority to Chinese Patent Application No. CN201511028722.9, filed on Dec. 31, 2015, both of which are hereby incorporated by reference in their entireties.

TECHNICAL FIELD

The present application relates to the technical field of touch screens, and in particular, relates to a pressure detection structure and a touch device.

BACKGROUND

At present, touch devices (for example, touch mobile phones) generally detect pressure caused by touches of users' hands by using a pressure sensor. The pressure detection structure of a touch device is mounted on a middle frame of the touch device, and includes a cover, a display device and a pressure sensor. When the display device is an LCD display device (that is, a display screen), the display module is a liquid crystal module. The display device further includes optical members and a housing bearing the liquid crystal module and the optical members. When the display device is an LED display device, the display module is an LED module, and the display device further includes a flexible foam layer for use in light shading and cushioning.

As illustrated in FIG. 1.1, when the display device is an LCD display device (that is, a display screen), the pressure detection structure of the touch device includes a cover 1, a middle frame 4, a display screen 2 and a pressure sensor 3. The pressure sensor 3, the display screen 2 and the cover 1 are sequentially stacked in the middle frame from bottom to top, and a gap 5 is present between the pressure sensor 3 and the display screen 2. Generally, the pressure sensor 3 is a capacitive sensor, and as illustrated in FIG. 1.2, includes a substrate 6 and detection electrodes 7 arranged in a matrix form on the substrate 6. The detection electrodes 7 of the pressure sensor 3 and an external reference electrode form the capacitance as illustrated in FIG. 1.3. Each of the detection electrodes 7 on the substrate 6 forms a capacitance C with a reference electrode 9. In the pressure detection structure as illustrated in FIG. 1.1, the reference electrode is an electrically conductive layer in the display screen, the capacitance structure thereof is as illustrated in FIG. 1.4. Pressure detection is practiced as follows: when a force is applied to the cover 1, the cover 1 deforms, such that the spacing between the pressure sensor 3 and the display screen 2 is changed, and thus the capacitance between the pressure sensor 3 and an electrically conductive layer of the display screen 2 is changed. Accordingly, the pressure is identified according to the variation quantity of the capacitance.

As seen from the implementation principle, a detection spacing between the display screen 2 and the pressure sensor 3 needs to be well controlled, wherein the detection spacing is the gap 5 as illustrated in FIG. 1.1. However, the gap 5 is subject to complicated and more working processes and masses of parts to be assembled during the mass production, and thus the assembling is subject to a great tolerance. In addition, the tolerance of the spacing between the display screen 2 and the pressure sensor 3 of different machines may affect consistency of the machines, and thus the user experience is different between the different machines. Moreover, falloff and extrusion-caused deformation of the entire product may simply change the gap, thereby lowering reliability of the products.

Therefore, it is a technical problem to be solved urgently in the related art on how to perform pressure detection.

SUMMARY

In view of the above, one technical problem to be solved by the present application is to provide a pressure detection structure and a touch device, which are capable of accurately detecting the pressure, and enhancing the reliability of products.

The present application provides a pressure detection structure, the structure being mounted on a middle frame of a touch device, and including a cover, a display device and a pressure sensor, the display device being arranged below the cover, and the display device including a display module; wherein the pressure sensor is arranged in the display device; any electrically conductive member in the display device or the middle frame which is electrically conductive is used as a reference electrode; and a variable gap is present between the pressure sensor and the reference electrode, and the pressure sensor outputs a pressure signal according to variation of capacitance between a sensing electrode thereof and the reference electrode.

The present application further provides a pressure detection structure, including a cover, a display screen, a pressure sensor and a middle frame, the display screen and the cover being sequentially from bottom to top stacked in the middle frame; wherein the pressure sensor is arranged in the display screen; the display screen includes optical members and a liquid crystal display module which are sequentially stacked from bottom to top, and a housing bearing the optical members and the liquid crystal display module, the housing including a back shell and a support connected to an edge of the back shell; the pressure sensor is disposed between the optical members and the back shell; and a gap is present inside the display screen.

The present application further provides a pressure detection structure, the structure being mounted on a middle frame of a touch device, and including a cover, a display device, a pressure sensor, the display device being arranged below the cover, and the display device including a display module; wherein the pressure sensor is arranged between the cover and the display device; any electrically conductive member in the display device or the middle frame which is electrically conductive is used as a reference electrode; and a variable gap is present between the pressure sensor and the reference electrode, and the pressure sensor outputs a pressure signal according to variation of capacitance between a sensing electrode thereof and the reference electrode.

As seen from the above technical solutions, according to the present application, a pressure sensor is arranged in the display device, and any electrically conductive member or the middle frame which is electrically conductive is used as a reference electrode. A variable gap is present between the pressure sensor and the reference electrode, and the pressure sensor outputs a pressure signal according to variation of capacitance between a sensing electrode thereof and the reference electrode. As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test with no need to performing the pressure test until the display device is assembled into the middle frame, which improves the test and production efficiency.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein.

FIG. 1.1 is a schematic structural diagram of a pressure detection structure in the related art;

FIG. 1.2 is a schematic structural diagram of a pressure sensor in FIG. 1;

FIG. 1.3 is a schematic structural diagram of capacitance formation between a detection electrode and a reference electrode of the pressure sensor;

FIG. 1.4 is a schematic capacitance structural diagram of the pressure detection structure in the related art;

FIG. 2.1 is a schematic structural diagram of a pressure detection structure according to one embodiment of the present application;

FIG. 2.2 is a schematic structural diagram of a pressure detection structure according to another embodiment of the present application;

FIG. 2.3 is a schematic structural diagram of a pressure detection structure according to still another embodiment of the present application;

FIG. 2.4 is a schematic structural diagram of a pressure detection structure according to still yet another embodiment of the present application;

FIG. 3.1 is a schematic structural diagram of a pressure sensor in a pressure detection structure;

FIG. 3.2 is a schematic capacitance structural diagram of pressure detection in a pressure detection structure;

FIG. 3.3 is a schematic structural diagram of one arrangement position of a pressure sensor in a pressure detection structure;

FIG. 3.4 is a schematic structural diagram of another arrangement position of a pressure sensor in a pressure detection structure;

FIG. 3.5 is a schematic structural diagram of still another arrangement position of a pressure sensor in a pressure detection structure;

FIG. 3.6 is a schematic structural diagram of still yet another arrangement position of a pressure sensor in a pressure detection structure;

FIG. 7 is still yet another schematic capacitance structural diagram of pressure detection in a pressure detection structure;

FIG. 8.1 is a schematic structural diagram of a pressure detection structure according to still yet another embodiment of the present application;

FIG. 8.2 is a schematic structural diagram of a pressure detection structure according to still yet another embodiment of the present application;

FIG. 9.1 is a schematic structural diagram of a pressure detection structure according to still yet another embodiment of the present application;

FIG. 9.2 is a schematic structural diagram of a pressure detection structure according to still yet another embodiment of the present application;

FIG. 10.1 is a schematic structural diagram of a pressure detection structure according to still yet another embodiment of the present application;

FIG. 10.2 is a schematic structural diagram of a pressure detection structure according to still yet another embodiment of the present application;

DETAILED DESCRIPTION

Figure 4:
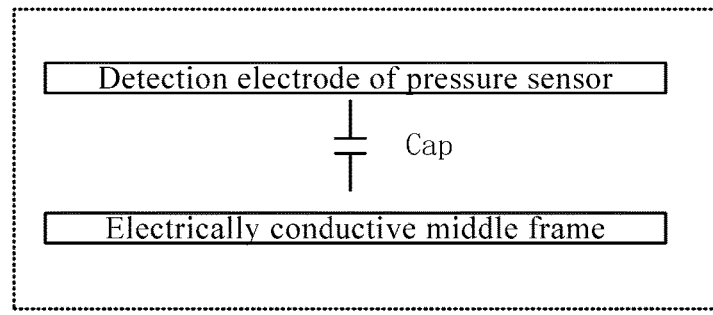
FIG. 4 is a schematic capacitance structural diagram of pressure detection in a pressure detection structure.

According to the present application, a pressure sensor is arranged in the display device, and any electrically conductive member in the display device or the middle frame which is electrically conductive is used as a reference electrode. A variable gap is present between the pressure sensor and the reference electrode, and the pressure sensor outputs a pressure signal according to variation of capacitance between a sensing electrode thereof and the reference electrode. As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test, with no need to performing the pressure test until the display device is assembled into the middle frame, which improves the test and production efficiency.

Definitely, the implementation of any technical solution of the present application does not need to achieve all the above advantages.

To make a person skilled in the art better understand the technical solutions of the present application, the technical solutions in the embodiments of the present application are described clearly and completely with reference to the accompanying drawings in the embodiments of the present application. Apparently, the described embodiments are merely some of rather than all of the embodiments of the present application. Based on the embodiments of the present application, all other embodiments derived by persons of ordinary skill in the art without any creative efforts shall fall within the protection scope of the present application.

Specific implementations of the present application are further described hereinafter with reference to drawings of the present application.

Referring to FIG. 2.1, the present application provides a pressure detection structure. The structure is mounted on a middle frame (not illustrated in the drawing) of a touch device, and includes a cover 1, a display device 2 and a pressure sensor 3, the display device 2 includes a display module 22.

The pressure sensor 3 is arranged in the display device 2.

Any electrically conductive member in the display device 2 or the middle frame which is electrically conductive is used as a reference electrode.

A variable gap is present between the pressure sensor 3 and the reference electrode, and the pressure sensor 3 outputs a pressure signal according to variation of capacitance between a sensing electrode 7 thereof and the reference electrode.

According to this embodiment, both the pressure sensor 3 and the reference electrode are arranged in the display device 2. As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test, with no need to performing the pressure test until the display device is assembled into the middle frame, which improves the test and production efficiency.

In a specific practice of the present application, referring to FIG. 2.2 and FIG. 2.3, when the display device 2 is an LCD display device, the display module 22 is a liquid crystal module, and the display device 2 further includes optical members 21 and a housing 23 bearing the liquid crystal module 22 and the optical members 21.

Referring to FIG. 2.2, the housing 23 mates with the cover 1 in a full cover type. The housing 23 is greater than the display module 22, and the display module 22 and the optical members 21 are both received in the housing 23. The housing 23 includes a back shell 231 and a support 232 connected to an edge of the back shell 231. The cover 1 is disposed on the top of the support 232, and an upper end of the support 232 is fixedly connected to the cover 1 via a bonding adhesive 8 or via other manners. For brevity, the middle frame is not illustrated in the drawings of the subsequent embodiments. It should be noted that a gap is presented inside the display device 2. Since the display module 22 in the display device 2 and the optical members 21 are not bonded to each other by the whole surface, a gap is present therebetween. The gap may be filled with air or flexible filler. For brevity, the gap is not illustrated in the drawings. The structure description in the subsequent embodiments is analogous, which is not given herein any further.

With respect to the display module in which the housing 23 mates with the cover 1 in the full cover type in FIG. 2.2, the pressure sensor 3 according to the present application is arranged in the display device 2, and disposed on a surface of a lower glass or upper glass of the display module 22.

Referring to FIG. 2.3, the housing 23 mates with the cover 1 in a partial cover type. The housing 23 is greater than the optical members 21 but is not greater than the display module 22. The optical members 21 is received in the housing 23. The display module 22 is disposed on a top of the support 232, and is fixedly connected to the upper end of the support 232 via the bonding adhesive 8 or via other manners.

With respect to the display module in which the housing 23 mates with the cover 1 in the partial cover type in FIG. 2.3, the pressure sensor 3 according to the present application is arranged in the display device 2, and disposed on a surface of a lower glass or an upper glass of the display module 22.

In addition, referring to FIG. 2.4, when the display device is an LED display device, the display module 22 is an LED module, and the display device 2 further includes a flexible foam layer 24 for use in light shading and cushioning.

Specifically, the pressure sensor 3 is a capacitive sensor, and detection electrodes thereof are generally arranged in a matrix form as illustrated in FIG. 3.1. Detection electrodes 7 arranged on a substrate 6 need to form capacitances Cap 1 with an external reference electrode, as illustrated in FIG. 3.2.

Referring to FIG. 3.3, the pressure sensor 3 may be disposed on a lower surface of a lower glass 221 of the display module 22. Referring to FIG. 3.4, the pressure sensor 3 may be disposed on an upper surface of the lower glass 221 of the display module 22. Referring to FIG. 3.5, the pressure sensor 3 may be disposed on a lower surface of an upper glass 222 of the display module 22. Referring to FIG. 3.6, the pressure sensor 3 may be disposed on an upper surface of the upper glass 222 of the display module 22.

Specifically, when the display device 2 is an LCD display device, the pressure sensor 3 is made from an optically transparent electrically conductive material, for example, ITO. Therefore, the pressure sensor 3 may be designed to be very thin, and thus the thickness of the display module 22 (the liquid crystal module) may not be increased.

When the pressure sensor 3 is disposed on the upper surface of the lower glass 221 of the display module 22, the pressure sensor 3 is a driving electrode on the upper surface of the lower glass 221 of the display module 22.

When the pressure sensor 3 is disposed on the upper surface of the upper glass 222 of the display module 22, the pressure sensor 3 is a driving electrode on the upper surface of the upper glass 222 of the display module 22.

The driving electrode according to this embodiment works in different working states at different time points. Such design reduces the working processes of adding electrically conductive layers on the lower glass 221 or the upper glass 222 of the display module 22, and thus lowers the cost.

When the pressure sensor 3 is as illustrated in FIG. 3.3 to FIG. 3.6, and the display device is an LCD display device or an LED display device, the reference electrode may be the electrically conductive middle frame which is included in the touch device.

Specifically, if the middle frame is made from an electrically conductive material, such as metal and the like, and the display device is an LCD display device or an LED display device, the electrically conductive middle frame may be used as the reference electrode.

When the cover 1 is under pressure, the pressure is transferred to the display device 22 such that the display module 22 is subjected to deformation. As such, the spacing between the detection electrode of the pressure sensor 3 and the middle frame is changed. Referring to FIG. 4, the capacitance between the detection electrode of the pressure sensor 3 and the electrically conductive middle frame used as the reference electrode is changed, and thus a pressure signal is generated.

The tolerance to be controlled according to this embodiment mainly includes the thickness of the bonding adhesive bonding the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. Moreover, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, when the pressure sensor 3 is as illustrated in FIG. 3.3 to FIG. 3.6, and the display device 2 is an LCD display device, the electrically conductive member of the optical members 21 which is included in the display device 2 is used as the reference electrode.

Specifically, the optical members 21 may be designed to be made from an electrically conductive material or a material having electrically conductive particles, thus forming the electrically conductive member used as the reference electrode.

Generally, the electrically conductive member of the optical members is used as the reference electrode, the housing 23 does not include the back shell 231, or the back shell 231 is not made from a metal material. Nevertheless, when the housing 23 includes a metal back shell 231, the electrically conductive member of the optical members 21 may also be used as the reference electrode.

Figure 5:
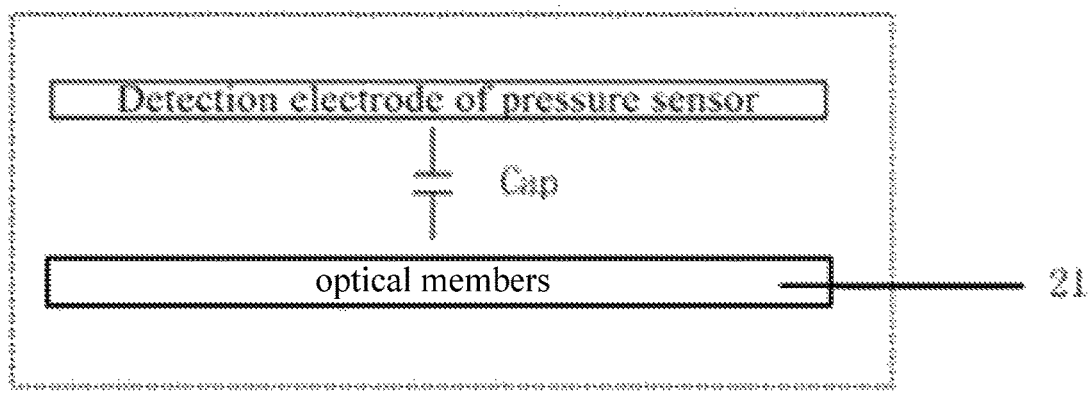
FIG. 5 is another schematic capacitance structural diagram of pressure detection in a pressure detection structure.

When the cover 1 is under pressure, the pressure is transferred to the display device 22 such that the display module 22 is subjected to deformation. As such, the spacing between the detection electrode of the pressure sensor 3 and the optical members 21 is changed. Referring to FIG. 5, the capacitance between the detection electrode of the pressure sensor 3 and the optical members 21 acting as the reference electrode changes, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, when the pressure sensor 3 is as illustrated in FIG. 3.3 to FIG. 3.6, and the display device 2 is an LCD display device, the housing 23 includes a metal back shell 231 and a support 232 connected to an edge of the metal back shell 231, the metal back shell 231 may be used as a reference electrode.

Figure 6:
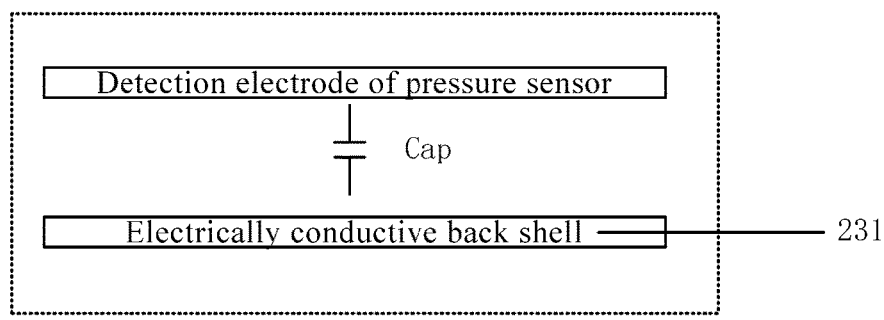
FIG. 6 is still another schematic capacitance structural diagram of pressure detection in a pressure detection structure.

When the cover 1 is under pressure, the pressure is transferred to the display device 22 such that the display module 22 is subjected to deformation. As such, the spacing between the detection electrode of the pressure sensor 3 and the metal back shell 231 is changed. Referring to FIG. 6, the capacitance between the detection electrode of the pressure sensor 3 and the metal back shell 231 (an electrically conductive material) acting as the reference electrode changes, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, a shielding electrode 14 is arranged in the display device 2, for shielding interference from an external reference plane.

The capacitance between the pressure sensor 3 and the shielding electrode 14 is constant.

The shielding electrode 14 is configured to shield interference from an external environment, and further control the tolerance.

Referring to FIG. 7, in the practice of the present application, three electrodes are desired to form two capacitances, and the detection electrode in the pressure sensor 3 is connected to an integrated control chip IC. The capacitance between the detection electrode and the reference electrode is an effective deformation detection capacitance Cap 1. That is, the deformation caused by pressure may change the spacing between these two electrodes, and thus changes the capacitance. Therefore, according to the present application, the pressure sensor 3 outputs a pressure signal to the integrated control chip IC by detecting the capacitance between the detection electrode thereof and the reference electrode.

The capacitance between the detection electrode and the shielding electrode is a fixed capacitance Cap 2, and the spacing between these two electrodes is not subject to the effect of force. The shielding electrode 14 is mainly to shield interference from an external reference plane, such that the effective deformation capacitance is only the capacitance Cap 1. This achieves a great effect in mitigating the external interference and controlling the tolerance.

Specifically, the shield electrode 14 is disposed in the display device 2, and is an electrically conductive layer above the pressure sensor 3. The shielding electrode 14 and the reference electrode are both an electrically conductive plane present in the internal structure of the display device 2. The shielding electrode 14, the reference electrode and the pressure sensor 3 (the detection electrode) are all disposed inside the display device 2.

As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test with no need to performing the pressure test until the display device is assembled into the middle frame, which improves the test and production efficiency.

In another specific practice of the present application, when the display device 2 is an LCD display device, referring to FIG. 8.1 and FIG. 8.2, the housing 23 includes a back shell 231 and a support 232 connected to an edge of the back shell 231, the pressure sensor 3 is disposed above the back shell 231.

Referring to FIG. 8.1, if no variable gap is present between the pressure sensor 3 and the back shell 231, the reference electrode is any electrically conductive member arranged above the back shell 231.

No variable gap is present between the pressure sensor 3 and the back shell 231. That is, the pressure sensor 3 is arranged on an upper surface of the back shell 231.

For example, the any electrically conductive member may be an electrically conductive member of the optical members which is included in the LCD display device, or an electrically conductive layer on a surface of the lower glass (either the upper surface or the lower surface thereof) or a surface of an upper glass (either the upper surface or the lower surface thereof), or an electrically conductive layer between the cover 1 and the upper glass.

Since a variable gap is present between the upper surface of the back shell 231 where the pressure sensor 3 is arranged and the reference electrode, the pressure sensor 3 may output a pressure signal by sensing variation of the gap.

Referring to FIG. 8.2, if a variable gap is present between the pressure sensor 3 and the back shell 231, the reference electrode is any electrically conductive member arranged above the back shell 231 or the back shell which is electrically conductive.

Since a variable gap is present between the pressure sensor 3 and the back shell 231, in addition to any electrically conductive member above the back shell 231, if the back shell 231 is made from an electrically conductive material, the electrically conductive back shell may also be used as the reference electrode.

Specifically, if a variable gap is present between the pressure sensor 3 and the back shell 231, the gap may be filled with a flexible substance.

Optionally, a reinforcing step 60 may be arranged, the reinforcing step 60 may be integrally formed with the housing 23, or may be assembled into the housing 23. As illustrated in FIG. 9.1 and FIG. 9.2, the reinforcing step 60 is arranged to project on a bottom of the back shell 231 or on an inner wall of the support 232, the reinforcing step may be integrally formed with the back shell 231 or the support 232 or separately arranged (that is, assembled into the back shell or the support), and all the optical members 21 of the display device 2 are disposed on the reinforcing step 60. As illustrated in FIG. 10.1 and FIG. 10.2, the reinforcing step 60 is arranged to project on a bottom of the back shell 231 or on an inner wall of the support 232, and all the optical members 21 of the display device 2 are disposed on the reinforcing step 60. The reinforcing step 60 causes a gap to be present between the pressure sensor 3 and the back shell 231, the gap may be an air gap or may be filled with flexible filler.

According to this embodiment, the pressure sensor 3 is arranged in a relatively independent manner, without impacting on the functionality of the display module 22. The pressure sensor 3 is irrelevant to the middle frame, and tolerance of assembling of the entire device and the like cause tiny impacts on the pressure detection. The pressure sensor 3 is closer to the reference electrode, and thus the sensitivity thereof is high.

When the cover 1 is under pressure, the pressure is transferred to the display device 22 such that the display module 22 is subjected to deformation. As such, the spacing between the detection electrode of the pressure sensor 3 and the reference electrode is changed. Referring to FIG. 8, the capacitance between the detection electrode of the pressure sensor 3 and an internal electrode of the reference electrode is changed, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, if no variable gap is present between the pressure sensor 3 and the back shell 231, the back shell 231 is an electrically conductive back shell, and the electrically conductive back shell 231 is used as a shielding electrode to shield interference from an external reference plane to the capacitance between the pressure sensor 3 and the reference electrode.

If no variable gap is present between the pressure sensor 3 and the back shell 231, a shielding electrode 14 is arranged in the display device 2, for shielding interference from an external reference plane.

The capacitance between the pressure sensor 3 and the shielding electrode 14 is constant.

The shielding electrode 14 is configured to shield interference from an external environment, and further control the tolerance.

Referring to FIG. 7, in the practice of the present application, three electrodes are desired to form two capacitances, and the detection electrode in the pressure sensor 3 is connected to an integrated control chip IC. The capacitance between the detection electrode and the reference electrode is an effective deformation detection capacitance Cap 1. That is, the deformation caused by pressure may change the spacing between these two electrodes, and thus changes the capacitance. Therefore, according to the present application, the pressure sensor 3 outputs a pressure signal to the integrated control chip IC by detecting the capacitance between the detection electrode thereof and the reference electrode.

The capacitance between the detection electrode and the shielding electrode is a fixed capacitance Cap 2, and the spacing between these two electrodes is not subject to the effect of force. The shielding electrode 14 is mainly to shield interference from an external reference plane, such that the effective deformation capacitance is only the capacitance Cap 1. This achieves a great effect in mitigating the external interference and controlling the tolerance.

Specifically, the shield electrode 14 is disposed in the display device 2, and is an electrically conductive layer above the pressure sensor 3. The shielding electrode 14 and the reference electrode are both an electrically conductive plane present in the internal structure of the display device 2. The shielding electrode 14, the reference electrode and the pressure sensor 3 (the detection electrode) are all disposed inside the display device 2.

As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test, with no need to performing the pressure test until the display device is assembled into the middle frame, which improves the test and production efficiency.

Figure 11:
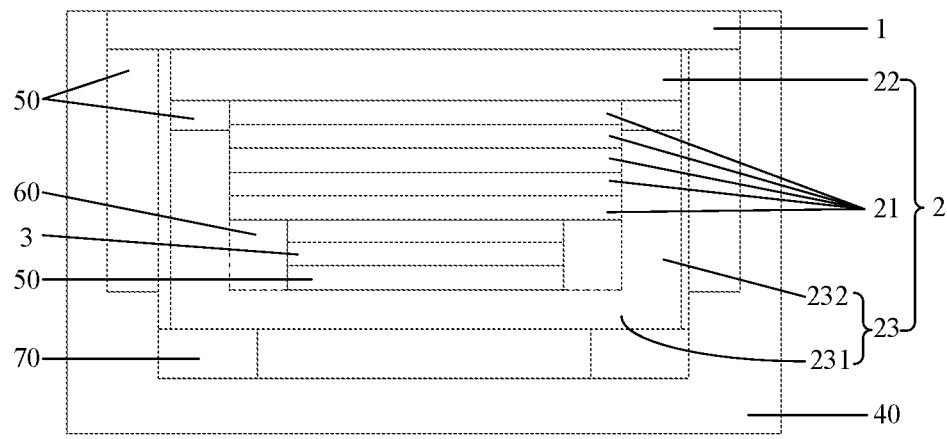
FIG. 11 is a schematic structural diagram of a pressure detection structure according to still yet another embodiment of the present application.

In another specific practice of the present application, a cushion is arranged between the back shell 231 and the middle frame. As illustrated in FIG. 11, a cushion 70 is arranged between the edge of the back shell 231 and a middle frame 40, the cushion 70 may be made from an elastic material or a rigid material. When the display device 2 is under downward pressure, the cushion 70 abuts against the support 232 of the display device 2, such that a bonding adhesive 50 between the support 232 and the display module 22 is compressed. Then the cover 10 is fixedly connected to the middle frame 40 via the bonding adhesive 50. As such, the tolerance of the bonding adhesive between the support 232 and the display module 22 of different machines may be reduced or even eliminated.

Figure 12:
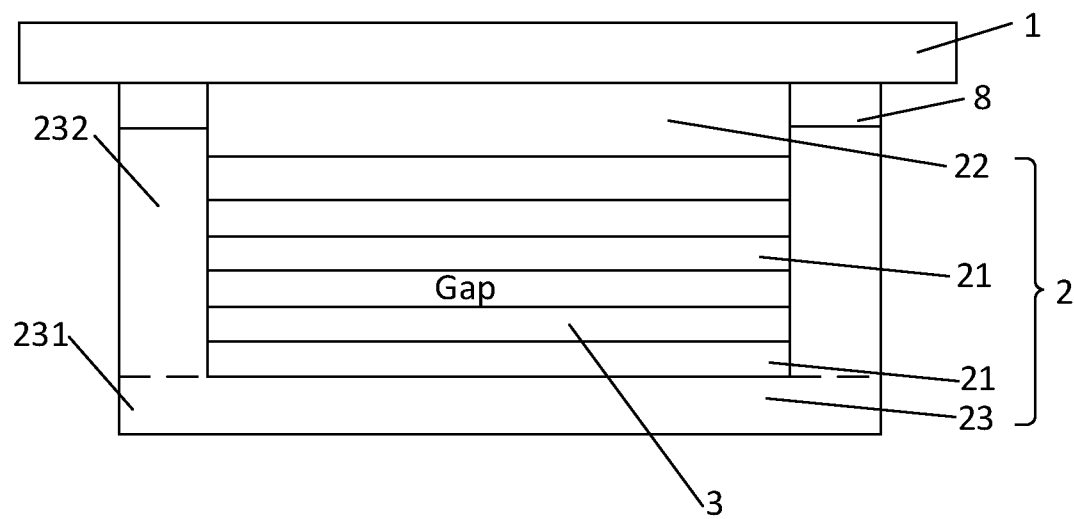
FIG. 12 is a schematic structural diagram of a pressure detection structure according to still yet another embodiment of the present application.

Referring to FIG. 12, when the display device is an LCD display device, the pressure sensor 3 is disposed on the surface of the optical members 21 which is included in the display device 2.

The pressure sensor 3 is made from an optically transparent electrically conductive material, for example, ITO. Therefore, the pressure sensor 3 may be designed to be very thin, and thus the thickness of the display module 22 may not be increased.

When the pressure sensor 3 is as illustrated in FIG. 12, the reference electrode may be the electrically conductive middle frame which is included in the touch device.

Specifically, if the middle frame is made from an electrically conductive material, such as metal and the like, and the display device is an LCD display device or an LED display device, the electrically conductive middle frame may be used as the reference electrode.

When the cover 1 is under pressure, the pressure is transferred to the display module 22 such that the display module 22 is subjected to deformation. As such, the spacing between the detection electrode of the pressure sensor 3 and the middle frame is changed. Referring to FIG. 4, the capacitance between the detection electrode of the pressure sensor 3 and the electrically conductive middle frame used as the reference electrode is changed, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, when the pressure sensor 3 is as illustrated in FIG. 12, the reference electrode may be an electrically conductive member in the display module 22.

Figure 13:
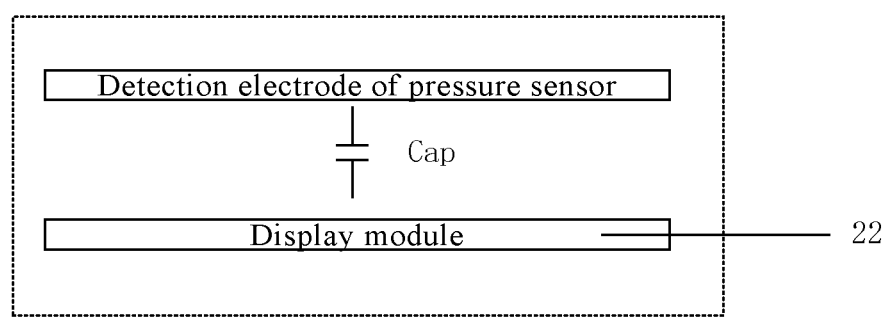
FIG. 13 is still yet another schematic capacitance structural diagram of pressure detection in a pressure detection structure.

When the cover 1 is under pressure, the pressure is transferred to the display module 22 such that the display module 22 is subjected to deformation. As such, the spacing between the detection electrode of the pressure sensor 3 and the middle frame is changed. Referring to FIG. 13, the capacitance between the detection electrode of the pressure sensor 3 and the electrically conductive middle frame used as the reference electrode is changed, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, when the pressure sensor 3 is as illustrated in FIG. 12, the electrically conductive member of the optical members 21 which is included in the display device is used as a reference electrode.

Specifically, the optical members 21 may be designed to be made from an electrically conductive material or a material having electrically conductive particles, thus forming the electrically conductive member used as the reference electrode.

Generally, when the electrically conductive member of the optical members is used as the reference electrode, the housing 23 does not include the back shell 231, or the back shell 231 is not made from a metal material. Nevertheless, when the housing 23 includes the back shell 231, the electrically conductive member of the optical members 21 may also be used as the reference electrode.

When the cover 1 is under pressure, the pressure is transferred to the display module 22 such that the display module 22 is subjected to deformation. As such, the spacing between the detection electrode of the pressure sensor 3 and the optical members 21 is changed. Referring to FIG. 5, the capacitance between the detection electrode of the pressure sensor 3 and the optical members 21 acting as the reference electrode changes, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impact on pressure sensing carried out by the pressure detection structure.

In another specific practice of the present application, when the pressure sensor 3 is as illustrated in FIG. 12, the housing 23 includes a metal back shell 231 and a support 232 connected to an edge of the metal back shell 231, wherein the metal back shell 231 may be used as a reference electrode.

When the cover 1 is under pressure, the pressure is transferred to the display module 22 such that the display module 22 is subjected to deformation. As such, the spacing between the detection electrode of the pressure sensor 3 and the metal back shell 231 is changed. Referring to FIG. 6, the capacitance between the detection electrode of the pressure sensor 3 and the metal back shell 231 (an electrically conductive material) acting as the reference electrode is changed, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, a shielding electrode 14 is arranged in the display device 2, for shielding interference from an external reference plane.

The capacitance between the pressure sensor 3 and the shielding electrode 14 is constant.

The shielding electrode 14 is configured to shield interference from an external environment, and further control the tolerance.

Referring to FIG. 7, in the practice of the present application, three electrodes are desired to form two capacitances, and the detection electrode in the pressure sensor 3 is connected to an integrated control chip IC. The capacitance between the detection electrode and the reference electrode is an effective deformation detection capacitor Cap 1. That is, the deformation caused by pressure may change the spacing between these two electrodes, and thus changes the capacitor. Therefore, according to the present application, the pressure sensor 3 outputs a pressure signal to the integrated control chip IC by detecting the capacitance between the detection electrode thereof and the reference electrode.

The capacitance between the detection electrode and the shielding electrode is a fixed capacitance Cap 2, and the spacing between these two electrodes is not subject to the effect of force. The shielding electrode 14 is mainly to shield interference from an external reference plane, such that the effective deformation capacitance is only the capacitance Cap 1. This achieves a great effect in mitigating the external interference and controlling the tolerance.

Specifically, the shield electrode 14 is disposed in the display device, and is an electrically conductive layer above the pressure sensor 3. The shielding electrode 14 and the reference electrode are both an electrically conductive plane present in the internal structure of the display device 2. The shielding electrode 14, the reference electrode and the pressure sensor 3 (the detection electrode) are all disposed inside the display device 2.

As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test, with no need to performing the pressure test until the display device is assembled into the middle frame, which improves the test and production efficiency.

Figure 14:
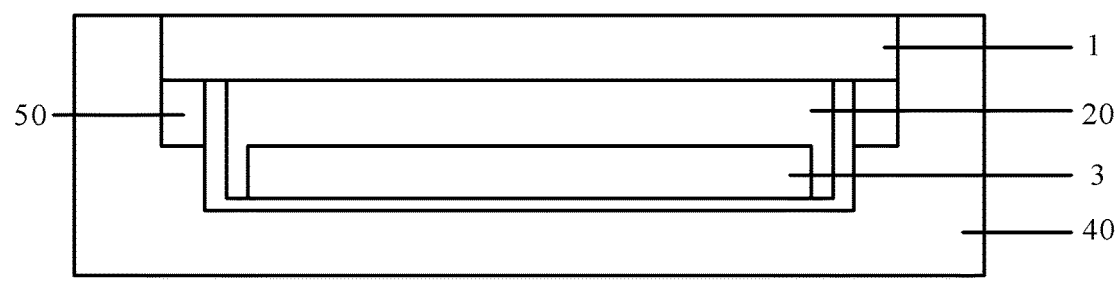
FIG. 14 is a schematic structural diagram of a pressure detection structure according to still yet another embodiment of the present application.

Referring to FIG. 14, the present application further provides a pressure detection structure, including a cover 1, a display screen 20, a pressure sensor 3 and a middle frame 40. The display screen 20 and the cover 1 are sequentially stacked in the middle frame from bottom to top, and an edge of the cover 1 is fixed to the middle frame 40 via a bonding adhesive 50 or via other manners. The pressure sensor 3 is arranged inside the display screen 20, and specifically a capacitive pressure sensor.

Figure 15:
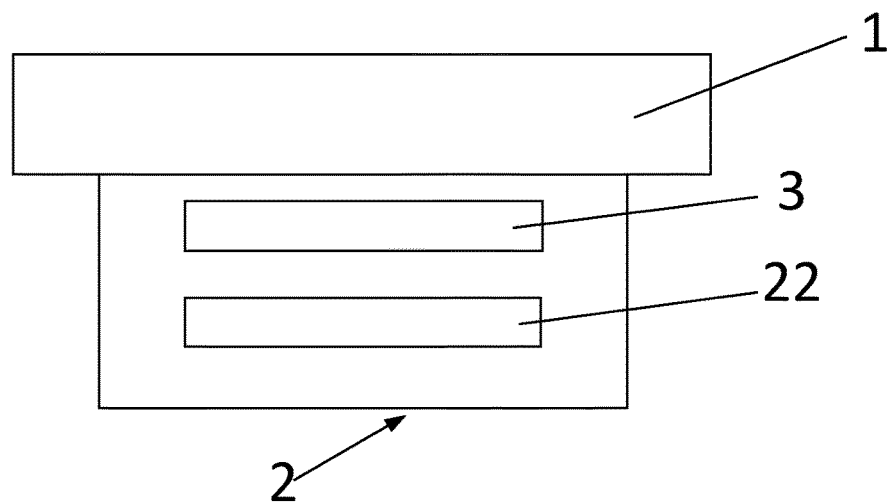
FIG. 15 is a schematic structural diagram of a pressure detection structure according to still yet another embodiment of the present application.

Referring to FIG. 15, the present application provides a pressure detection structure. The structure is mounted on a middle frame (not illustrated in the drawing) of a touch device, and includes a cover 1, a display device 2 and a pressure sensor 3, wherein the display device 2 includes a display module 22.

The pressure sensor 3 is arranged between the cover 1 and the display device 2.

Any electrically conductive member in the display device 2 may be used as the reference electrode.

A variable gap is present between the pressure sensor 3 and the reference electrode, and the pressure sensor 3 outputs a pressure signal according to variation of capacitance between a sensing electrode 7 thereof and the reference electrode.

According to this embodiment, both the pressure sensor 3 and the reference electrode are arranged in the display device 2. As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test, with no need to performing the pressure test until the display device is assembled into the middle frame, which improves the test and production efficiency.

When the pressure sensor 3 is as illustrated in FIG. 15, and the display device is an LCD display device or an LED display device, the reference electrode may be the electrically conductive middle frame which is included in the touch device.

Specifically, if the middle frame is made from an electrically conductive material, such as metal and the like, and the display device is an LCD display device or an LED display device, the electrically conductive middle frame may be used as the reference electrode.

When the cover 1 is under pressure, the pressure is transferred to the display module 22 such that the display module 22 is subjected to deformation. As such, the spacing between the detection electrode of the pressure sensor 3 and the middle frame is changed. Referring to FIG. 4, the capacitance between the detection electrode of the pressure sensor 3 and the electrically conductive middle frame used as the reference electrode is changed, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, when the pressure sensor 3 is as illustrated in FIG. 14, and the display device 2 is an LCD display device, the electrically conductive member of the optical members 21 which is included in the display device 2 is used as the reference electrode.

Specifically, the optical members 21 may be designed to be made from an electrically conductive material or a material having electrically conductive particles, thus forming the electrically conductive member used as the reference electrode.

Generally, when the electrically conductive member of the optical members is used as the reference electrode, the housing 23 does not include the back shell 231, or the back shell 231 is not made from a metal material. Nevertheless, when the housing 23 includes the metal back shell 231, the electrically conductive member of the optical members 21 may also be used as the reference electrode.

When the cover 1 is under pressure, the pressure is transferred to the display module 22 such that the display module 22 is subjected to deformation. As such, the spacing between the detection electrode of the pressure sensor 3 and the optical members 21 is changed. Referring to FIG. 5, the capacitance between the detection electrode of the pressure sensor 3 and the optical members 21 acting as the reference electrode changes, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, when the pressure sensor 3 is as illustrated in FIG. 14, and the display device 2 is an LCD display device, the housing 23 includes a metal back shell 231 and a support 232 connected to an edge of the metal back shell 231, wherein the metal back shell 231 may be used as a reference electrode.

When the cover 1 is under pressure, the pressure is transferred to the display module 22 such that the display module 22 is subjected to deformation. As such, the spacing between the detection electrode of the pressure sensor 3 and the metal back shell 231 is changed. Referring to FIG. 6, the capacitance between the detection electrode of the pressure sensor 3 and the metal back shell 231 (an electrically conductive material) acting as the reference electrode changes, and thus a pressure signal is generated.

The tolerance to be controlled according to this embodiment mainly includes the thickness of the bonding adhesive for adhering the housing 23 and the display module 22 (in the partial cover type) or the cover 1 (in the full cover type), and the flatness of the housing 23. The thickness of the bonding adhesive bonding the housing 23 and the display module 22 may be simply controlled, and the tolerance thereof is practically small. However, the flatness of the housing 23 may be designed to a high precision. As compared with the structure design in FIG. 1, the design according to this embodiment may more accurately facilitate pressure sensing.

In addition, in this embodiment, the tolerance influencing factors are all controlled within the display module 22, and thus a better control may be achieved in mass production. Hence, the mass product is not easily affected by the assembling of the entire touch device. Falloff, extrusion-caused deformation and the like of the touch device cause tiny impacts on pressure sensing carried out by the pressure detection structure.

In another specific practice of the present application, a shielding electrode 14 is arranged in the display device 2, for shielding interference from an external reference plane.

The capacitance between the pressure sensor 3 and the shielding electrode 14 is constant.

The shielding electrode 14 is configured to shield interference from an external environment, and further control the tolerance.

Referring to FIG. 7, in the practice of the present application, three electrodes are desired to form two capacitances, and the detection electrode in the pressure sensor 3 is connected to an integrated control chip IC. The capacitance between the detection electrode and the reference electrode is an effective deformation detection capacitor Cap 1. That is, the deformation caused by pressure may change the spacing between these two electrodes, and thus changes the capacitor. Therefore, according to the present application, the pressure sensor 3 outputs a pressure signal to the integrated control chip IC by detecting the capacitance between the detection electrode thereof and the reference electrode.

The capacitance between the detection electrode and the shielding electrode is a fixed capacitance Cap 2, and the spacing between these two electrodes is not subject to the effect of force. The shielding electrode 14 is mainly to shield interference from an external reference plane, such that the effective deformation capacitance is only the capacitance Cap 1. This achieves a great effect in mitigating the external interference and controlling the tolerance.

Specifically, the shield electrode 14 is disposed in the display device 2, and is an electrically conductive layer above the pressure sensor 3. The shielding electrode 14 and the reference electrode are both an electrically conductive plane present in the internal structure of the display device 2. The shielding electrode 14, the reference electrode and the pressure sensor 3 (the detection electrode) are all disposed inside the display device 2.

As such, the consistency of pressure sensing between touch devices is prevented from being affected by a tolerance of the spacing between the display module and the middle frame, and the tolerance of the assembling of the entire touch device is reduced. In addition, during test of mass production, an individual display device may be subjected to the pressure test, with no need to performing the pressure test until the display device is assembled into the middle frame, which improves the test and production efficiency.

In another specific practice of the present application, the present application further provides a touch device, including a middle frame and a pressure detection structure mounted on the middle frame, wherein the pressure detection structure is as described above.

Although specific embodiments are described, those skilled in the art may make modifications and variations to these embodiments based on the basic inventive concept of the present application. Therefore, the specific embodiments and all such modifications and variations shall fall within the protection scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A pressure detection structure being mounted on a middle frame of a touch device, and comprising:
   a cover;
   a display device being arranged below the cover, wherein the display device comprises a display module;
   a pressure sensor comprising a sensing electrode arranged in the display device; and
   a reference electrode;
   wherein the pressure sensor is configured to output a pressure signal according to variation of capacitance between the sensing electrode and the reference electrode,
   wherein the display device is an LCD display device and comprises a housing of the display module, the housing comprises a back shell that is electrically conductive and a support connected to an edge of the back shell,
   wherein the reference electrode is the back shell, the pressure sensor is disposed above the back shell; a variable gap is formed between the pressure sensor and the back shell, a reinforcing step is arranged on a bottom of the back shell or on an inner wall of the support, wherein the variable gap between the pressure sensor and the back shell is formed by the reinforcing step.

2. The pressure detection structure according to claim 1, wherein a shielding electrode for shielding interference from an external reference plane is arranged in the display device; and
   a capacitance between the pressure sensor and the shielding electrode is constant.

3. The pressure detection structure according to claim 2, wherein the shielding electrode is an electrically conductive member arranged above the pressure sensor.

4. The pressure detection structure according to claim 1, wherein the back shell that is electrically conductive is used as a shielding electrode to shield interference caused by an external reference plane to a capacitance between the pressure sensor and the reference electrode.

5. The pressure detection structure according to claim 1, wherein a cushion is arranged between the back shell and the middle frame.

6. A pressure detection structure, comprising:
   a cover, an LCD display screen, a pressure sensor; and a middle frame, the display screen and the cover being sequentially stacked in the middle frame from bottom to top;
   wherein the pressure sensor comprises a sensing electrode arranged in the display screen; the display screen comprises optical members and a liquid crystal module which are sequentially stacked from bottom to top, and a housing bearing the optical members and the liquid crystal module, the housing comprising a back shell that is electrically conductive and a support connected to an edge of the back shell; wherein the back shell that is electrically conductive is configured to work as a reference electrode, the pressure sensor is disposed above the back shell, and the pressure sensor is configured to output a pressure signal according to variation of capacitance between the sensing electrode and the reference electrode; a variable gap is formed between the pressure sensor and the back shell, a reinforcing step is arranged on a bottom of the back shell or on an inner wall of the support, wherein the variable gap between the pressure sensor and the back shell is formed by the reinforcing step.

7. A touch device, comprising a middle frame and a pressure detection structure mounted on the middle frame, wherein the pressure detection structure comprises:
   a cover;
   a display device being arranged below the cover, and the display device comprises a display module;
   a pressure sensor comprising a sensing electrode arranged in the display device; and
   a reference electrode;
   wherein the pressure sensor is configured to output a pressure signal according to variation of capacitance between the sensing electrode and the reference electrode,
   wherein the display device is an LCD display device and comprises a housing of the display module, wherein the housing comprises a back shell that is electrically conductive and a support connected to an edge of the back shell,
   wherein the reference electrode is the back shell, the pressure sensor is disposed above the back shell; a variable gap is formed between the pressure sensor and the back shell, a reinforcing step is arranged on a bottom of the back shell or on an inner wall of the support, wherein the variable gap between the pressure sensor and the back shell is formed by the reinforcing step.

* * * * *